(12) United States Patent
Sainton

(10) Patent No.: US 8,395,354 B2
(45) Date of Patent: Mar. 12, 2013

(54) POWER SUPPLY/CHARGER

(75) Inventor: Joseph B. Sainton, Guangdong (CN)

(73) Assignee: Ever Win International Corporation, City of Industry, CA (US)

( * ) Notice: Subject to any disclaimer, the term of this patent is extended or adjusted under 35 U.S.C. 154(b) by 253 days.

(21) Appl. No.: 12/840,964

(22) Filed: Jul. 21, 2010

(65) Prior Publication Data

US 2012/0019213 A1    Jan. 26, 2012

(51) Int. Cl.
*H01M 10/46* (2006.01)
(52) U.S. Cl. ...................................... 320/111
(58) Field of Classification Search .................. 320/107, 320/111, 114, 134, 136
See application file for complete search history.

(56) References Cited

U.S. PATENT DOCUMENTS

| 5,465,011 A * | 11/1995 | Miller et al. ................. 363/34 |
| 6,232,675 B1 * | 5/2001 | Small ............................. 307/30 |
| 6,914,416 B2 * | 7/2005 | Thomas et al. ............... 320/136 |
| 2005/0258805 A1 * | 11/2005 | Thomas et al. ............... 320/134 |

* cited by examiner

*Primary Examiner* — Edward Tso
(74) *Attorney, Agent, or Firm* — Joe Nieh

(57) ABSTRACT

An electronic circuit that is normally used in a car cigarette lighter adapter is disclosed. It is designed to meet the high performance requirements of the Apple Computer specification for charging iPod and iPhone, while still retaining low cost. The circuit is composed of input protection components, surge regulator, FET switch, inductor-capacitor smoothing filter, gate drive components, voltage regulator, current regulator, current sense element, and voltage reference.

17 Claims, 9 Drawing Sheets

POWER SUPPLY/CHARGER

BACKGROUND

1. Field of Invention

The present invention relates generally to electrical chargers for electronic devices. More specifically, the present invention relates to vehicle electrical chargers for electronic devices with universal serial buses (USB).

2. Description of Related Art

Since Apple Inc. has sold hundreds of millions of portable personal electronic devices such as iPods®, iPhones® and iPads®, a means to recharge their internal batteries while being used in the car is necessary. This is normally accomplished with a device that plugs into the vehicle's cigarette lighter socket that converts the vehicles loosely regulated voltage of 13.8 volts to the USB standard of 4.75 to 5.25 volts.

Various cabling arrangements are being used from a standard USB cable to different length coil cords. The electronic circuits are typically step-down switching regulators. Most manufacturers of these adapters want to have them certified by Apple Inc. as "Works With iPhone®" and/or "Made for iPod®". To get this certification, the adapter must meet all the requirements of the Apple Inc. specification. When marketing a product in such a competitive environment, price is of prime concern.

BRIEF SUMMARY OF THE INVENTION

The efficient power supply/charger of the present invention is a car charger comprising an input protection component, a surge regulator, a voltage controller component, a current limiting component, and a cable compensation component. The voltage controller components further comprises of a power output component and a gate drive.

An object of the car charger is to provide an efficient car charger capable of charging various electronic devices through their USB ports. A further object of the car charger is to provide an efficient car charger capable of regulating a surge versus attempting to clamp the surge. Another object of the car charger is to achieve low EMI without the necessity of using any ferrites. Yet another object of the car charger is to provide an efficient car charger that is capable of better response to transients and the capability to spread out EMI over a wider frequency range.

DETAILED DESCRIPTION OF THE PREFERRED EMBODIMENT

The following description and figures are meant to be illustrative only and not limiting. Other embodiments of this invention will be apparent to those of ordinary skill in the art in view of this description.

Figure 1:
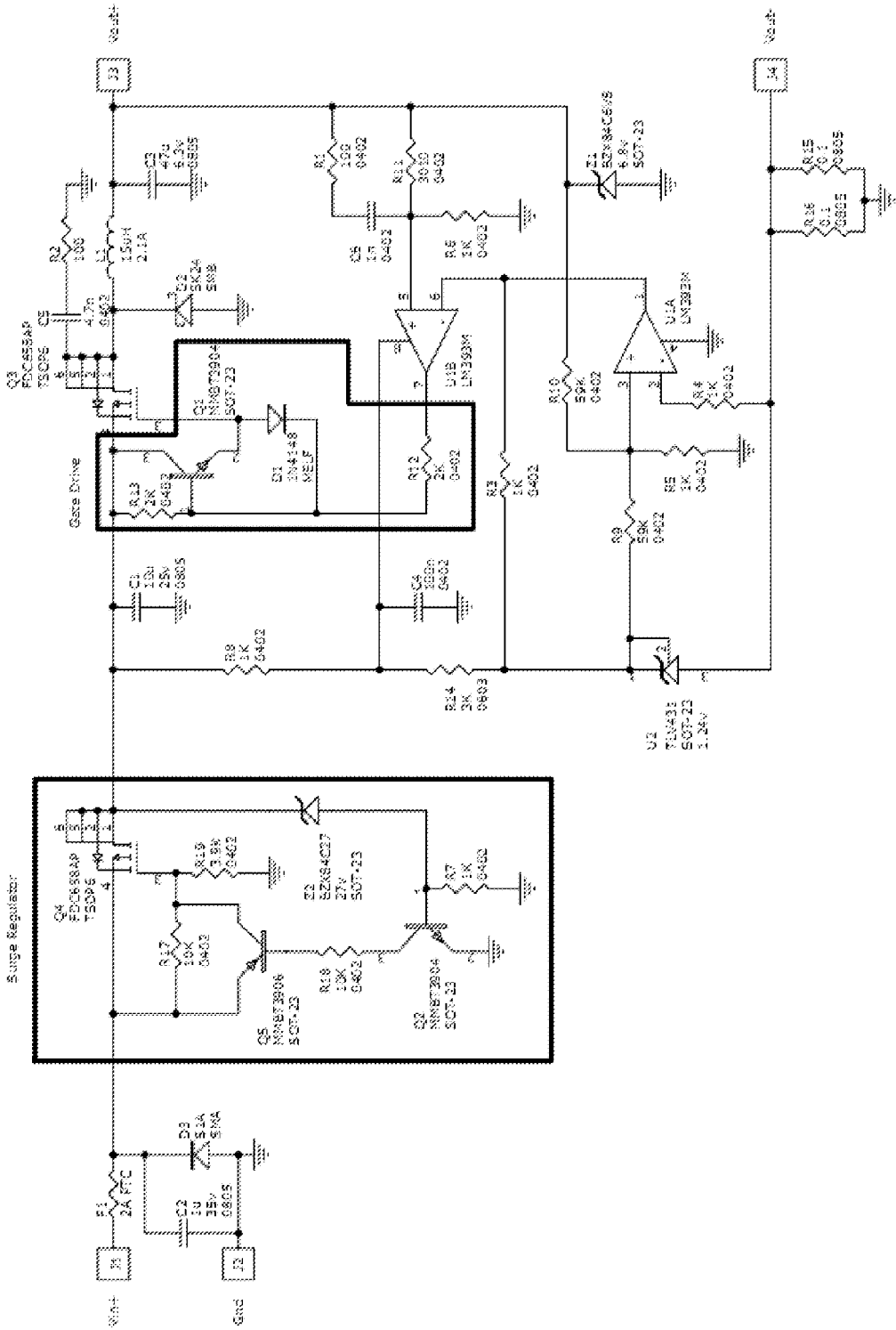
FIG. 1 shows the complete schematic diagram of the preferred embodiment of the efficient power supply/charger.

The preferred way to construct the invention is shown in FIG. 1. Vout+ and Vout− can be connected directly to a USB or other type of connector, or connected to a cable. Vin+ and Gnd are normally connected to a positive tip spring and ground clip. In the preferred embodiment, the efficient power supply/charger comprises an input protection component, a surge regulator, a voltage controller component, a current limiting component, and a cable compensation component. The voltage controller components further comprises of a power output component and a gate drive.

Figure 2:
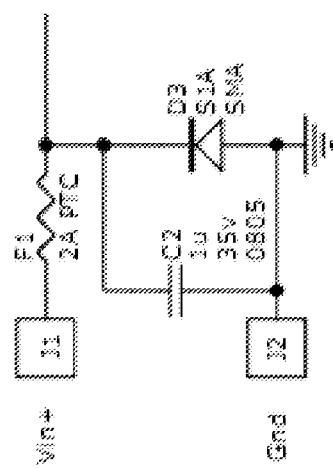
FIG. 2 shows the schematic diagram of the preferred embodiment of the input protection circuit.

FIG. 2 shows the input protection components comprised of F1, C2, and D3. F1 provides protection to the vehicle's electrical system in case of a shorted part inside the adapter. A 2 amp positive temperature coefficient thermistor (PTC) is shown, but any other type of fuse could be used, including a PCB trace fuse, which would be the lowest possible cost. C2 is a 1 uF capacitor used to provide a small amount of filtering. D3 is used to provide reverse input voltage protection.

Figure 3:
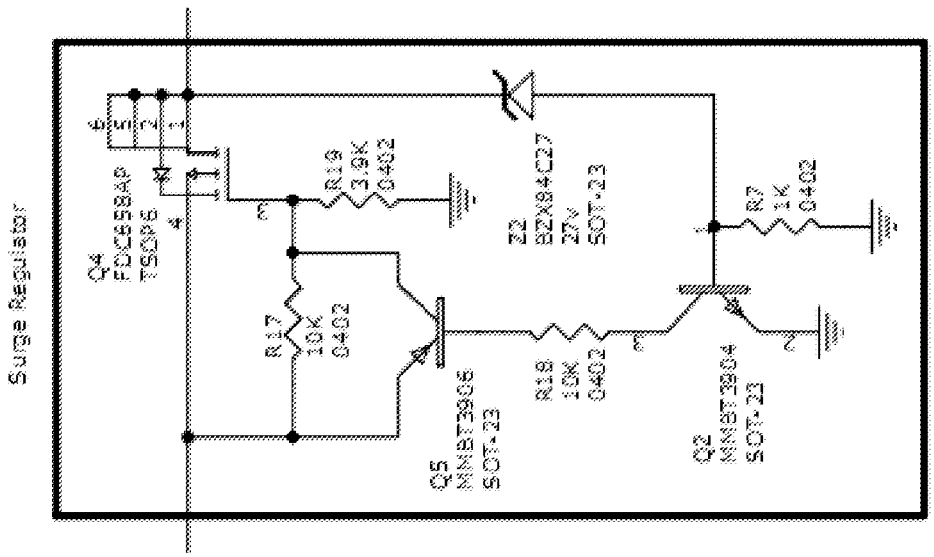
FIG. 3 shows the schematic diagram of the surge regulator circuit.

FIG. 3 shows the surge regulator comprised of Q4, Q2, Q5, Z2, R7, R17, R18, and R19. Normally, the adapter input current flows through Q4, which is biased on by R17 and R19. If the input voltage surge rises above 27 volts, Z2 starts to conduct current into the base of Q2. This causes Q2 to pull base current out of Q5. As Q5 starts to turn on, the gate to source voltage of Q4 is reduced to its linear operating region, regulating the output to a little less than 28 volts. During the Apple Inc. specified 40 v, 16 ms surge, repeated 5 times, the power dissipated in Q4 is the input current x the 12 volts across it. Worse case scenario testing has shown Q4 can survive with more than 1 amp passing through it.

The present invention has the benefit of regulating the surge, versus trying to clamp it to less than 30 volts using traditional parts and methods. Traditional parts would have to be very large and expensive, severely limiting the size of the enclosure and marketability. Using higher voltage parts, like most products do, is considerably more expensive.

Figure 4:
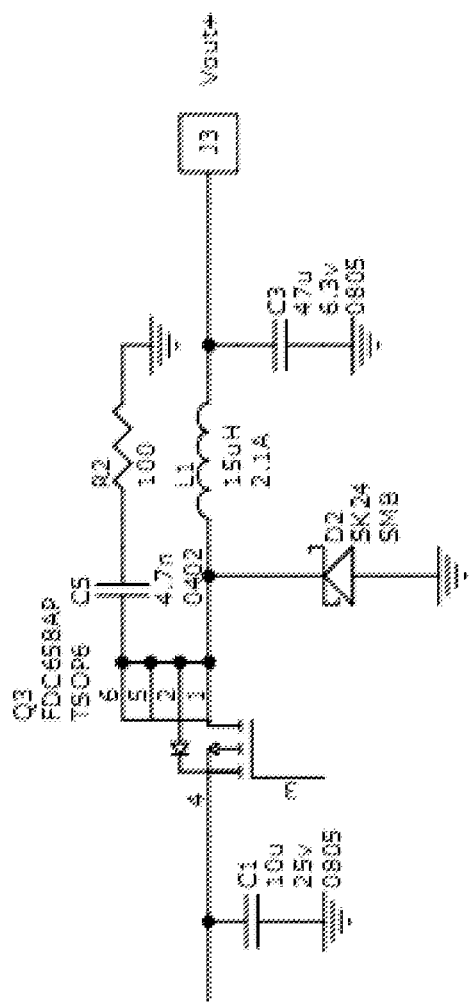
FIG. 4 shows the schematic diagram of the power output circuit.

FIG. 4 shows the power output stage made from Q3, C1, C3, L1, D2, C5, and R2. When Q3 is turned on, the input voltage causes a current to start ramping up through L1, which charges C3. As Q3 is turned off, the reverse voltage caused by the collapsing magnetic field of L1, is clamped by D2. An R-C snubbing network is comprised of C5 and R2 to reduce EMI.

Figure 5:
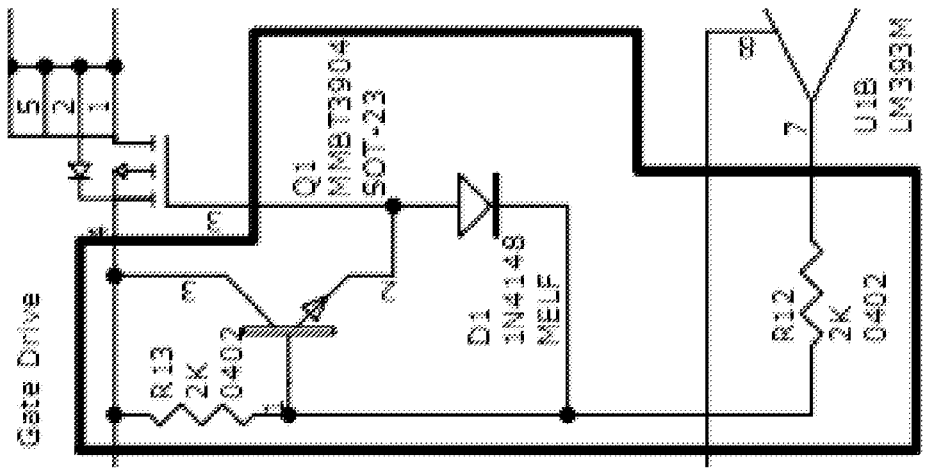
FIG. 5 shows the schematic diagram of the gate drive circuit.

FIG. 5 shows the gate drive circuit made from R12, R13, D1, and Q1. When U1-B is off (open collector) the field-effect transistor (FET's) gate to source voltage is held to less than 0.6 volts by R13 and Q1. As U1-B turns on, Q1 is turned off by D1 and R12 slowly pulls the gate voltage down, turning on the FET.

Careful control of the gate drive to the FET is the key to achieving low EMI without having to use any ferrites. Traditional methods switch the FET on and off as quickly as possible for high efficiency. This introduces large amounts of EMI. By turning the FET on slowly, when the current is at a minimum, EMI reduction is achieved. The FET must be turned off quickly, since the current is at a maximum, but this can be easily dealt with by the R-C snubber. The other unique feature of the gate drive circuit is that operation in both the digital and linear regions is possible, depending on the load.

Figure 6:
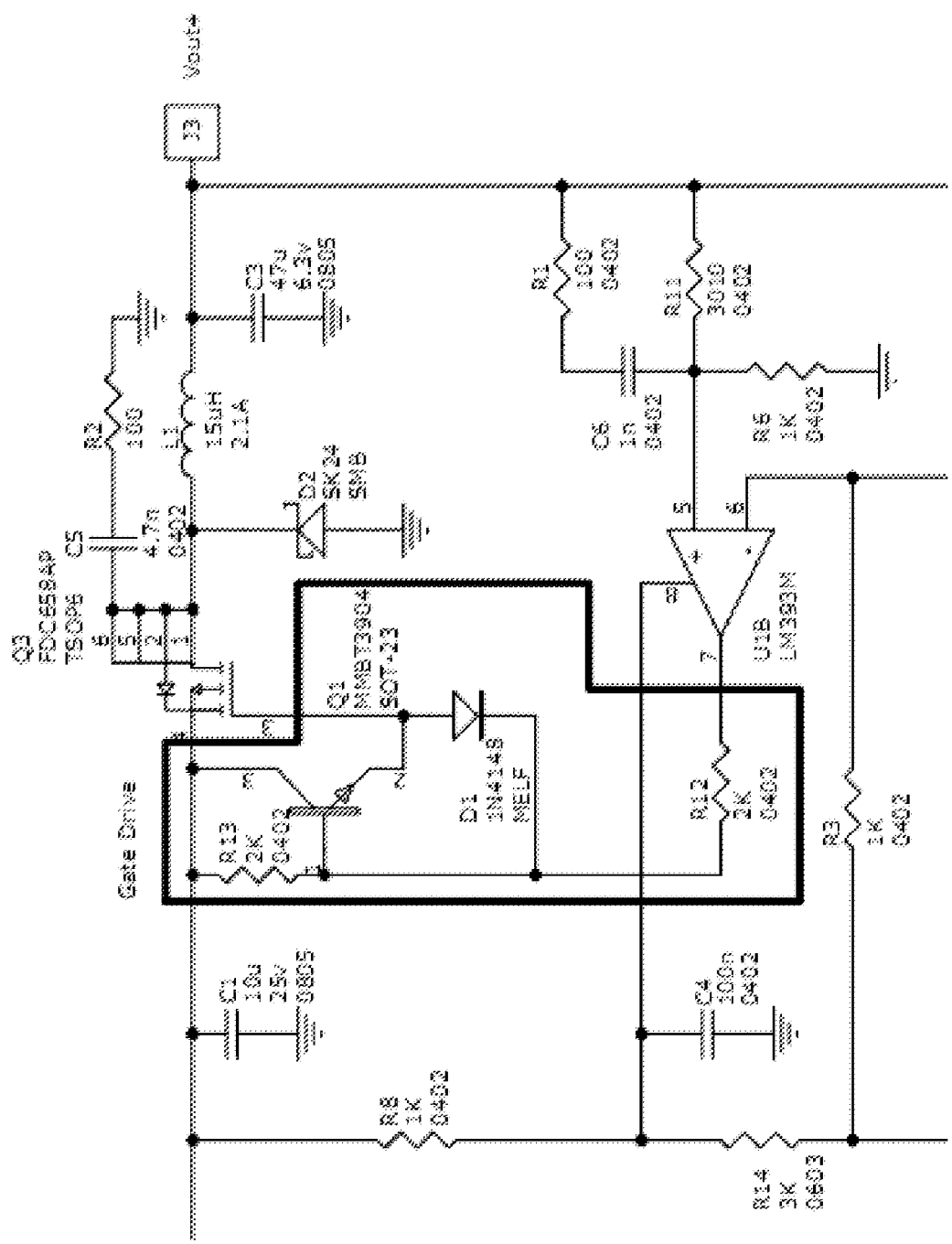
FIG. 6 shows the schematic diagram of the voltage controller circuit.

FIG. 6 shows how the voltage controller works. U1-B's inverting input is normally biased at 1.24 volts. The output voltage is controlled by the ratio of R11 to R6. R1 and C6 provide a "speed up" function by coupling more of the output ripple into the comparator input. As can be seen, this is a very simple on-off controller.

Extremely good line and load transient response is difficult to achieve with traditional constant frequency PWM controllers. The on-off controller with conditioned gate drive can respond to transients much better due to its cycle-by-cycle nature. Another advantage is the inherent frequency jitter. This tends to spread out the EMI, instead of concentrating it at a single frequency.

Figure 7:
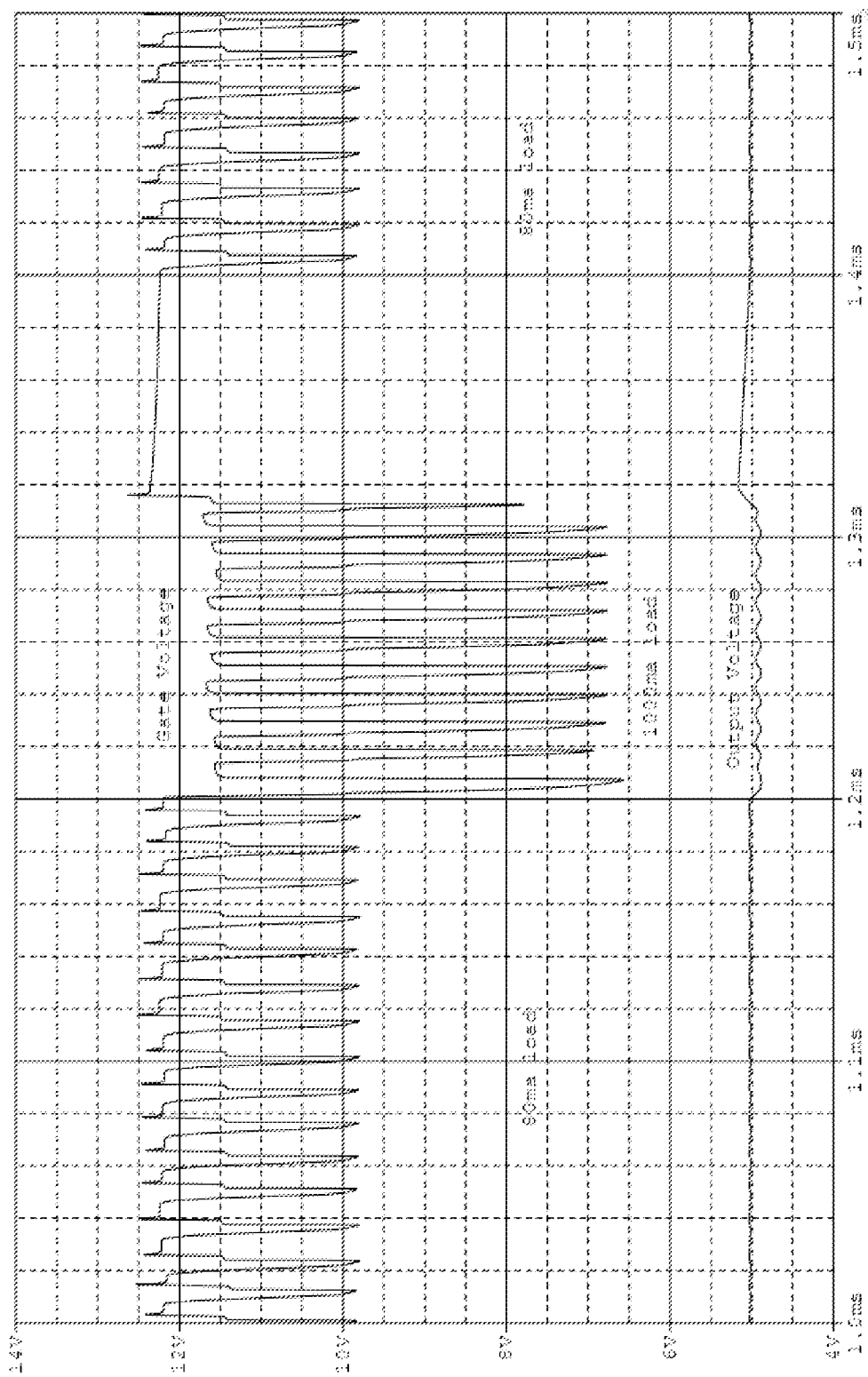
FIG. 7 shows the output and gate voltage under a variable load of 80 mA to 1000 mA.

FIG. 7 shows the output and gate voltages under a variable load of 80 ma to 1000 ma. As can be seen, the gate voltage drive changes in amplitude as well as pulse width.

Figure 8:
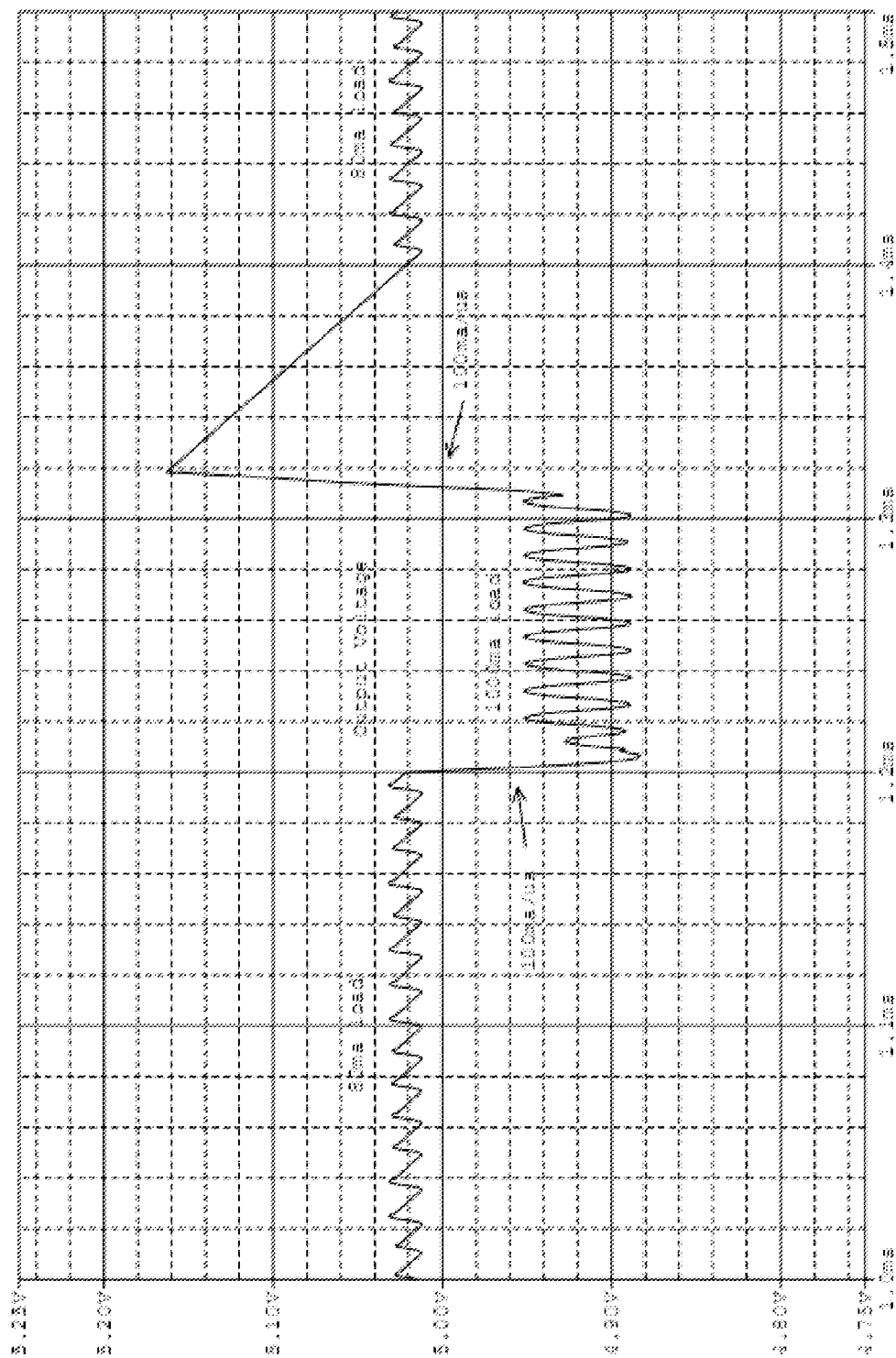
FIG. 8 shows the output voltage during dynamic load change of 80 mA to 1000 mA.

FIG. 8 shows a closer inspection of the output voltage. As can be seen, the output easily stays in spec during a dynamic load change of 80 ma to 1000 ma at a slew rate of 100 ma/micro-s. This is at the end of a standard 0.25Ω USB cable.

Figure 9:
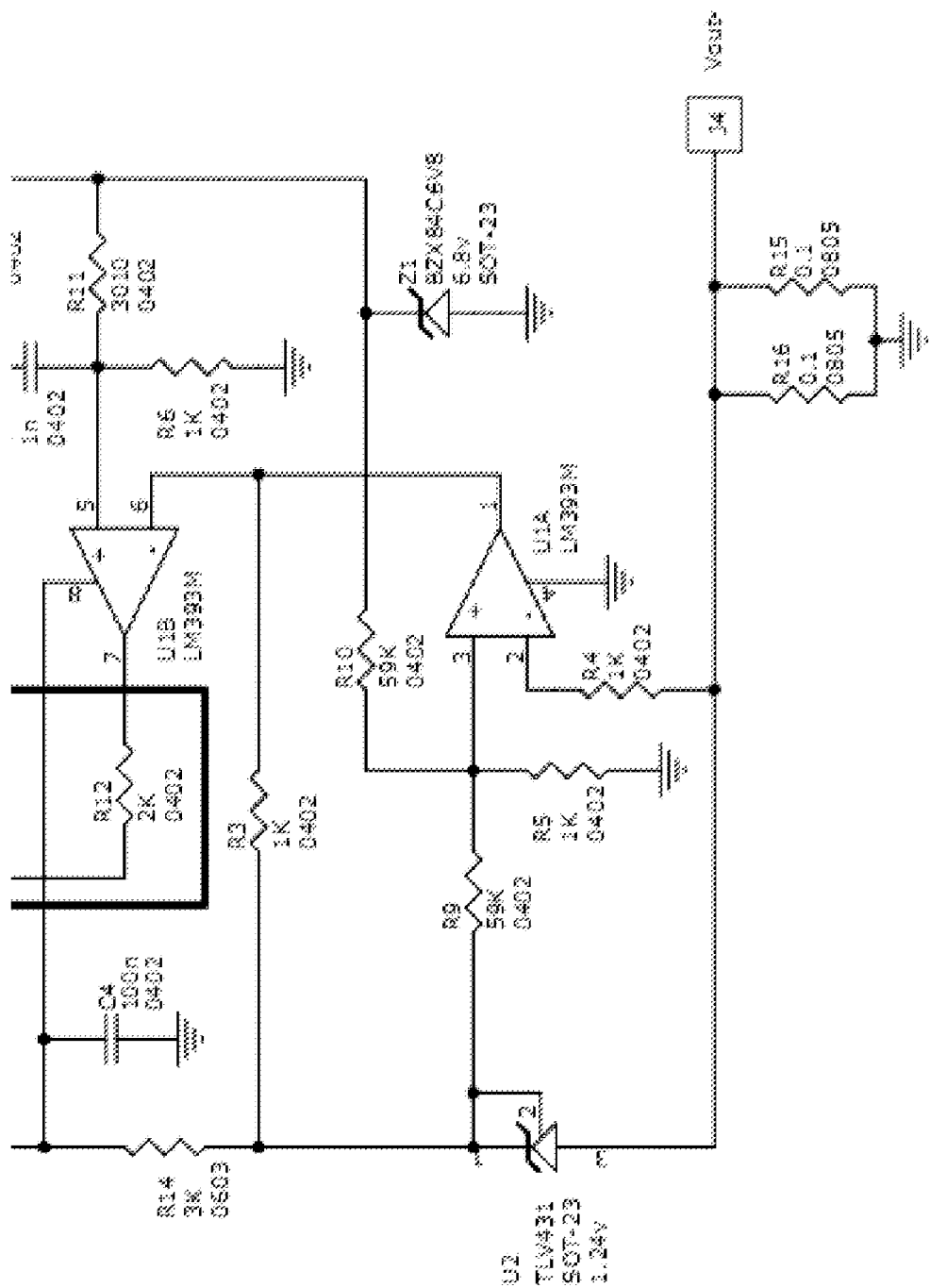
FIG. 9 shows the schematic diagram of the current limiting and cable compensation circuit.

FIG. 9 shows how the current is limited and cable compensation is performed. R15 and R16 are the current sensing elements with U2 "riding on top" of the current sense voltage. U1-A's non-inverting input is biased by the 1.24 volt reference as well as the output voltage. This provides a current foldback as well as a soft start function. If the returned load current exceeds the threshold, U1-A's output pulls the reference on U1-B's inverting input low, turning off the FET. As the output current decreases below the threshold, U1-A's output turns off, returning control of the FET to U1-B. As the load current increases from minimum to maximum, the reference voltage seen at U1-B's inverting input increases by 50 mv/amp. This increase causes the output voltage between Vout+ and Vout− to increase, compensating for the I×R loss of the cable. This effect can be seen in FIG. 8.

Figure 10:
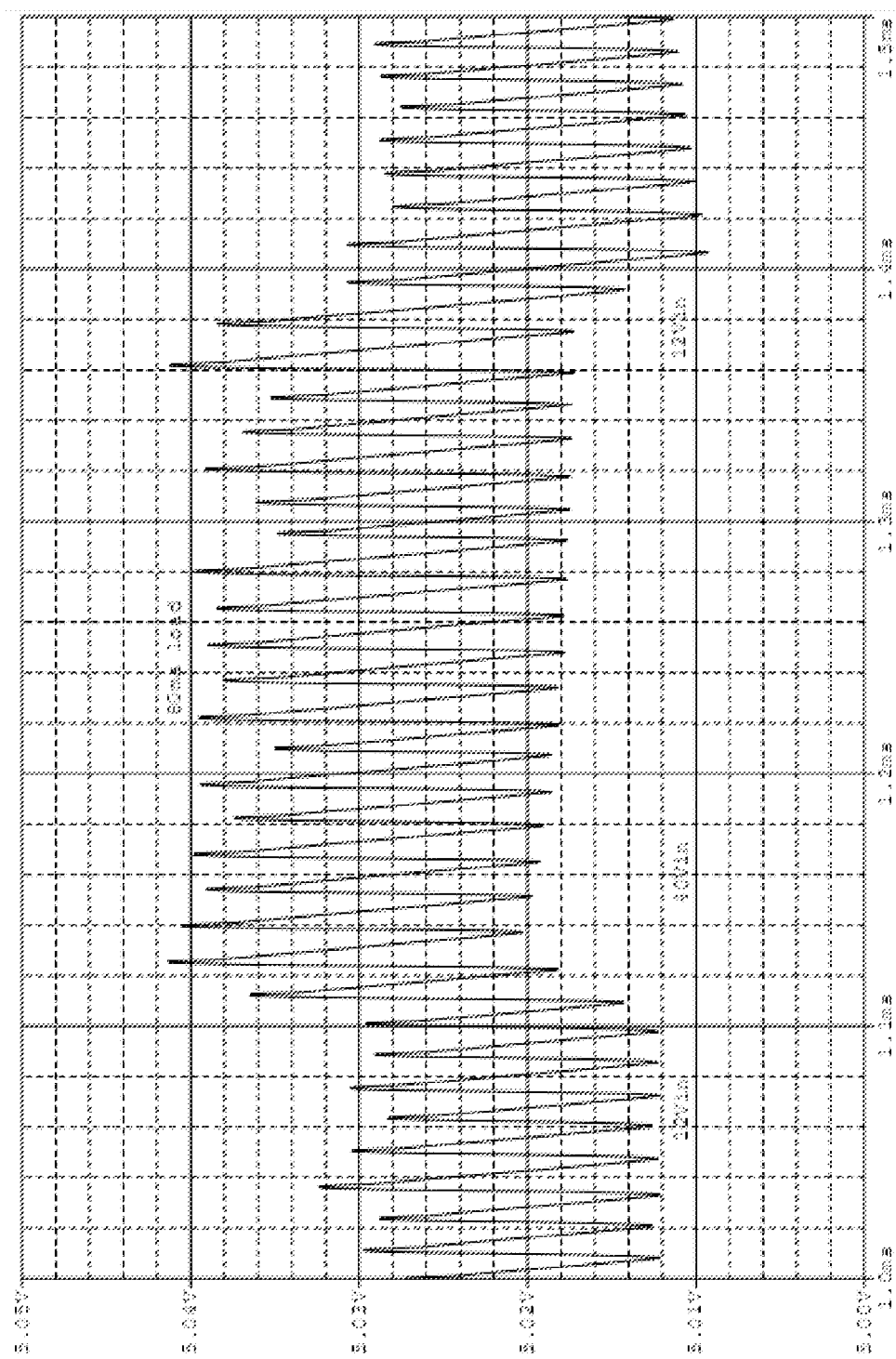
FIG. 10 shows the output voltage loaded to 80 mA and subjected to a 40V input surge.

FIG. 10 shows the output loaded to 80 ma and subjected to a 40 volt input surge. As can be seen, the surge is "transparent", having little effect on the output.

Figure 11:
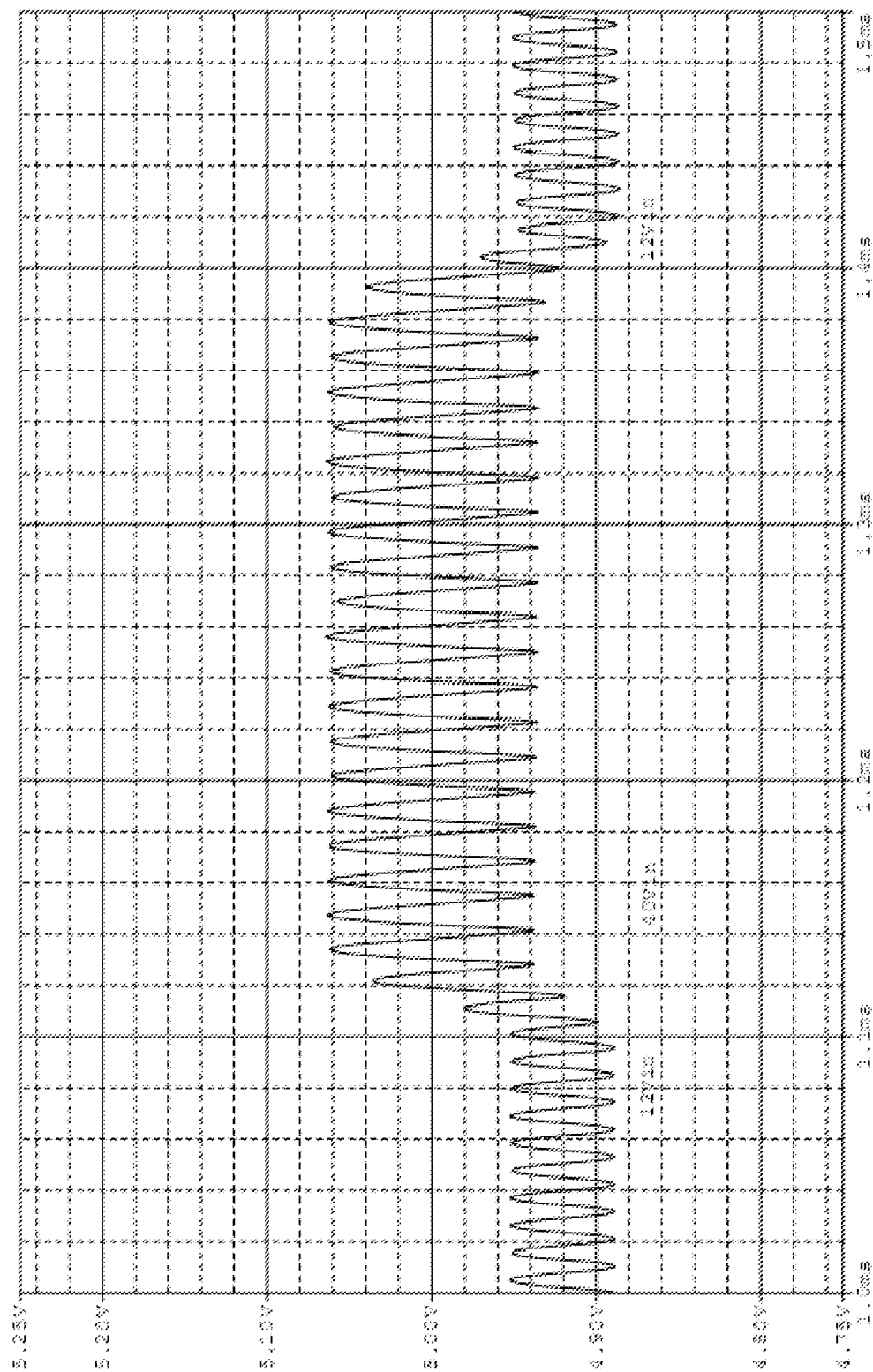
FIG. 11 shows the output voltage loaded to 1 A and subjected to a 40V input surge.

FIG. 11 shows the output loaded to 1 amp while subjected to a 40 volt input surge. The output stays within the spec of 4.75 to 5.25 volts.

An alternative construction of the current invention replaces F1 with a PCB trace fuse to lower cost. Yet another embodiment of the current invention replaces U2 with a 2.5 volt reference to reduce the amount of cable compensation. Another alternative embodiment of the efficient power supply/charger removes all the surge regulator components and replaces Q3 with a more expensive 40 volt FET to save space. Additional embodiment of the efficient power supply/charger use R15 and R16 with different values to achieve different current limiting and cable compensation characteristics.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An efficient power supply/charger comprising:
   an input protection component to protect an input voltage from short circuit in the power supply/charger;
   a surge regulator to regulate the input voltage;
   a voltage controller component to control an output voltage;
   a current limiting component to limit a current through the power supply/charger; and
   a cable compensation component to compensate the voltage drop through a cable.

2. An efficient power supply/charger as in claim 1 wherein said voltage controller component further comprises of a power output component and a gate drive.

3. An efficient power supply/charger as in claim 1 wherein said input protection component comprises of a 2 amp positive temperature coefficient thermistor.

4. An efficient power supply/charger as in claim 1 wherein said input protection component comprises of a positive temperature coefficient thermistor trace fuse.

5. An efficient power supply/charger as in claim 1 wherein said input protection component comprises of a 1 uF capacitor.

6. An efficient power supply/charger as in claim 2 wherein said power output component comprises of a R-C snubbing network to reduce EMI.

7. An efficient power supply/charger comprising:
   an input protection means to protect an input voltage from short circuit in the power supply/charger;
   a surge regulation means to regulate the input voltage;
   a voltage controlling means to control an output voltage;
   a current limiting means to limit a current through the power supply/charger; and
   a cable compensation means to compensate the voltage drop through a cable.

8. An efficient power supply/charger as in claim 7 wherein said voltage controlling means further comprises of a power output means and a gate drive.

9. An efficient power supply/charger as in claim 7 wherein said input protection means comprises of a 2 amp positive temperature coefficient thermistor.

10. An efficient power supply/charger as in claim 7 wherein said input protection means comprises of a positive temperature coefficient thermistor trace fuse.

11. An efficient power supply/charger as in claim 7 wherein said input protection means comprises of a 1 uF capacitor.

12. An efficient power supply/charger as in claim 8 wherein said power output means comprises of a R-C snubbing network to reduce EMI.

13. An efficient power supply/charger comprising:
    an input protection means to protect an input voltage from short circuit in the power supply/charger;
    a surge regulation means to regulate the input voltage;
    a power output means to control the output from the power supply/charger;
    a gate drive to perform logic operations;
    a current limiting means to control the current through the power supply/charger; and
    a cable compensation means to compensate the voltage drop through a cable.

14. An efficient power supply/charger as in claim 13 wherein said input protection means comprises of a 2 amp positive temperature coefficient thermistor.

15. An efficient power supply/charger as in claim 13 wherein said input protection means comprises of a positive temperature coefficient thermistor trace fuse.

16. An efficient power supply/charger as in claim 13 wherein said input protection means comprises of a 1 uF capacitor.

17. An efficient power supply/charger as in claim 13 wherein said power output means comprises of a R-C snubbing network to reduce EMI.

* * * * *